Jan. 7, 1964  A. S. GEISLER  3,117,010
LIQUID SHORTENING EMULSIONS
Filed Aug. 26, 1960  2 Sheets-Sheet 1

FIGURE I

INVENTOR.
Alan S. Geisler
BY

Jan. 7, 1964    A. S. GEISLER    3,117,010
LIQUID SHORTENING EMULSIONS
Filed Aug. 26, 1960    2 Sheets-Sheet 2

INVENTOR.
Alan S. Geisler
BY

United States Patent Office 3,117,010
Patented Jan. 7, 1964

3,117,010
LIQUID SHORTENING EMULSIONS
Alan S. Geisler, Fairfax, Wilmington, Del., assignor to Atlas Chemical Industries, Inc., Wilmington, Del., a corporation of Delaware
Filed Aug. 26, 1960, Ser. No. 52,261
12 Claims. (Cl. 99—118)

This invention relates to novel liquid shortening compositions. In particular, the invention relates to novel liquid shortening emulsions comprising a fat base selected from the group consisting of liquid vegetable oils, plastic vegetable fats, plastic animal fats, and mixtures of these, water, and an emulsifier blend including at least one lipophile emulsifier selected from group A consisting of:

(1) Monoglycerides
(2) Sorbitan fatty acid esters
(3) Isosorbide fatty acid esters and at least one hydrophile emulsifier selected from group B consisting of (1) Polyoxyethylene sorbitan fatty acid esters
(2) Polyoxyethylene isosorbide fatty acid esters the lipophile emulsifier from group A always including a monoglyceride.

At the present time, plastic shortenings are generally used in the preparation of cakes and icings due to the superior quality cakes and icings obtained through their use. Liquid shortenings, such as vegetable oils, offer ease of handling and preparation but are generally recognized as producing cakes of poorer quality than those prepared using normally plastic shortenings.

It has been desirable for many years to develop a shortening with the baking qualities of normally plastic shortenings, and the fluidity and ease of handling of liquid vegetable oils. Attempts have been made to produce normally liquid shortenings capable of producing good cakes, but these liquid shortenings generally are either unstable, requiring agitation before use, or semi-solid at normal temperatures, requiring the application of heat in order to make them fluid.

It is, therefore, an object of this invention to provide a normally liquid shortening composition.

Another object of this invention is to provide a normally liquid shortening composition in the form of a stable emulsion.

Another object is to provide a normally liquid shortening which offers the ease of handling of liquid vegetable oils and which provides good quality in cakes and icings normally associated with plastic shortenings.

Another object of this invention is to provide a normally liquid shortening composition comprising an emulsion of a normally plastic shortening in water.

A still further object is to provide a normally liquid shortening composition comprising an emulsion of a liquid vegetable oil in water.

Other objects and purposes of this invention will be apparent from the description and examples which follow and especially by reference to the accompanying drawings in which.

Figure 1:
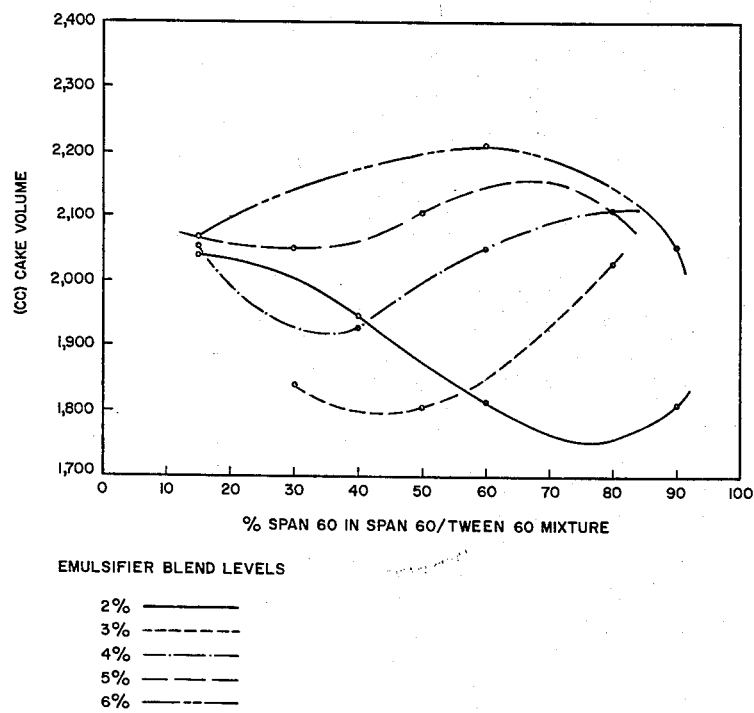
FIGURE 1 is a graph of white cake volumes plotted against the amount of sorbitan monostearate in a sorbitan monostearate-polyoxyethylene(20)sorbitan monostearate mixture with no monoglyceride present for various emulsifier levels.

It has been discovered that a stable, normally liquid shortening emulsion can be prepared by forming a composition having the following essential constituents: a plastic or liquid fat base, water, and an emulsifier blend. The emulsifier blend is prepared from at least one lipophile (oil soluble) emulsifier selected from group A consisting of (1) Monoglycerides
(2) Sorbitan fatty acid esters
(3) Isosorbide fatty acid esters blended with at least one hydrophile (water soluble) emulsifier selected from group B consisting of (1) Polyethylene sorbitan fatty acid esters
(2) Polyoxyethylene isosorbide fatty acid esters provided however, that the lipophile emulsifier always includes a monoglyceride.

As the fat base stock used in preparing the liquid shortening emulsions of this invention, it is preferred to use either a liquid vegetable oil or a plastic fat base which may comprise meat fats, hydrogenated vegetable fats, or admixtures of both. In accordance with this invention, it is generally preferred to avoid the use of hard vegetable or meat fats for they tend to form normally plastic or hard compositions rather than the desired normally liquid shortening emulsions of this invention.

If the fat base is present in amounts less than about 30 percent by weight, too much water per fat base is present in the liquid shortening emulsion which causes thin batters and poor cake volume and makes it very difficult to have the proper amounts of water and fat base as required by the particular cake or icing recipe. If greater than about 55 percent by weight is used, the fat base may tend to separate out of the emulsion, and it is more difficult to form a stable, liquid shortening emulsion. Therefore in accordance with this invention, it is preferred that the fat base stock be present in amounts ranging from about 30 to about 55 percent by weight of the liquid shortening emulsion.

As previously stated, liquid vegetable oils may also be used as the fat base, in accordance with this invention, to form a stable, liquid shortening emulsion. Generally, cakes prepared from vegetable oil, even with added monoglycerides, are poor in volume and have a porous, rubbery texture. Therefore, it was very surprising and totally unexpected that the liquid shortening emulsions of this invention, utilizing liquid vegetable oil as the fat base, produced good quality cakes having good volume and the fine light grain usually associated with cakes made from plastic shortenings.

The liquid shortening compositions of this invention comprise oil (fat base) in water emulsions. If less than about 40 weight percent of water is used to prepare the emulsion, it tends to form an unstable emulsion and the oil phase tends to separate. Since an oil-in-water emulsion is formed, amounts of water greater than about 65 percent by weight may be used and a stable emulsion will be formed, but one must be careful not to use too much water per fat base in the liquid shortening emulsion and thereby render it difficult to have the proper amounts of water and fat base as required by the particular cake or icing recipe. Therefore in accordance with the invention, it is preferred that the water constitute from about 40 to about 65 percent by weight of the liquid shortening emulsion.

In order to prepare the liquid shortening emulsions of this invention, it is essential that an emulsifier be present in the fat base-water mixture, and in accordance with this invention, the emulsifier comprises a blend of at least one lipophile emulsifier and at least one hydrophile emulsifier. The lipophile emulsifier may be selected from group A consisting of (1) Monoglycerides (2) Sorbitan fatty acid esters
(3) Isosorbide fatty acid esters and the hydrophile emulsifier may be selected from group B consisting of (1) Polyoxyethylene sorbitan fatty acid esters
(2) Polyoxyethylene isosorbide fatty acid esters provided however, that the lipophile emulsifier always include a monoglyceride.

The monoglycerides of fatty acids are essential constituents of the emulsifier blend used to prepare the liquid shortening emulsion. Hard monoglycerides tend to form semi-solid, nonpourable emulsions instead of the desired easy to handle, liquid shortening emulsions of this invention. Therefore, it is preferred that the monoglyceride be either liquid or plastic as represented by those monoglycerides having iodine numbers of at least about 40, with a preferred iodine valve within the range of about 45 to about 80. A typical plastic monoglyceride composition sold commercially under the trademark Atmul 80 and comprises mixed mono and diglycerides (42% α-mono) of fatty acids present in lard.

Figure 2:
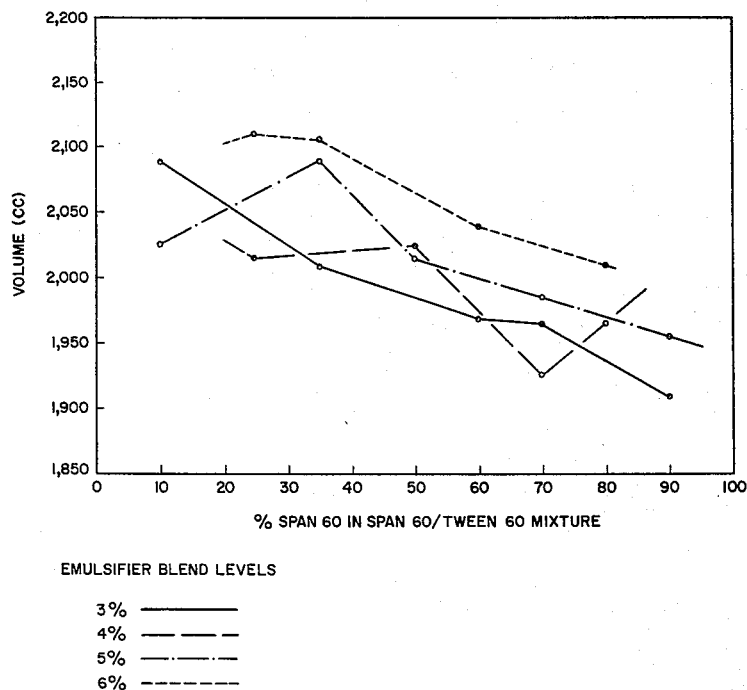
FIGURE 2 is a graph of white cake volumes plotted against the amount of sorbitan monostearate in a sorbitan monostearate-polyoxyethylene(20)sorbitan monostearate mixture with monoglyceride present (adjusted to 4% alphamonoglyceride) for various emulsifier levels.

The monoglycerides are an essential constituent of the liquid shortening emulsions of this invention, for they improve the quality of cakes and icings and they help the liquid shortening emulsions to give more uniform performance in cakes and icings as desonstrated in FIGURES 1 and 2.

FIGURES 1 and 2 are graphical presentations of white cake volumes plotted against the percent of sorbitan monostearate in a sorbitan monostearate/polyoxyethylene (20)sorbitan monostearate emulsifier blend at various emulsifier blend levels, ranging from 3 percent to 6 percent (not accounting for the monoglyceride present in FIGURE 2). As evidenced in FIGURE 1, with no monoglyceride present, it is very difficult to predict the percent of sorbitan monostearate which will give optimum results at the various emulsifier blend levels. FIGURE 2, with monoglyceride present adjusted to 4 percent alphamonoglyceride, demonstrates that it is much easier to predict the amount of sorbitan monostearate which gives optimum results, with sorbitan monstearate percentages between 10 and about 50 percent of the emulsifier blend giving uniformly good cake volume results at all emulsifier blend levels from 3 to 6 percent.

As demonstrated in FIGURES 1 and 2, the monoglycerides reduce the criticality in the mount of the emulsifier blend used in the emulsions of this invention, i.e., acceptable to optimum results in white cake volume can be achieved with emulsifier blend levels from 3 to 6 percent having sorbitan monostearate present in amounts up to about 50 percent. The monoglycerides also reduce the criticality in the ratio of the lipophile emulsifier (sorbitan monostearate) to hydrophile emulsifier (polyoxyethylene(20)sorbitan monostearate).

According to the invention, it is preferred that the fatty acid monoglycerides be present in amounts ranging from about 1.5 to about 6.0 percent by weight of the liquid shortening emulsion. If less monoglyceride is used the desirable effects are not adequately obtained. If more than about 6.0 percent is added, it is impractical and may have a deleterious effect on the stability and liquidity of the liquid shortening emulsion.

The fatty acid monoglycerides of this invention may be prepared either by glycerolysis, i.e., reacting glycerol with a fatty acid glyceride or other fatty acid ester, or by esterifying glycerol with a fatty acid having from about 12 to 22 carbon atoms. Examples of fatty acid monoglycerides which may be used as the monoglyceride constituent of the emulsifier blend are glycerol monostearate, glycerol monooleate, and glycerol monopalmitate. Other monoglycerides and modified monoglycerides, such as lactated, acetylated and tartrated monoglycerides, can be used as the monoglyceride constituent without departing from the scope of this invention.

It should be noted that while monoglycerides may be used alone, the mono- and diglycerides are generally so closely associated and so difficult to operate, that for practical purposes, mixtures of mono- and diglycerides may be used, though the monoglyceride is the active component in the liquid shortening emulsion.

In addition to a monoglyceride, the emulsifier blend must contain at least one hydrophile emulsifier and may also contain a lipophile emulsifier other than a monoglyceride. The other lipophile emulsifiers which may be used in addition to a monoglyceride may be selected from the group consisting of sorbitan fatty acid esters and isosorbide fatty acid esters. The hydrophile emulsifier may be selected from the group consisting of polyoxyethylene sorbitan fatty acid esters and polyoxyethylene isosorbide fatty acid esters.

According to this invention, the lipophile and hydrophile emulsifiers may be prepared by esterifying sorbitan and isosorbide with fatty acids having from about 12 to 22 carbon atoms, such as stearic, palmitic, lauric, oleic and behenic acids. Fatty acids having more than 12 carbon atoms are preferred. Preferably, the sorbitan and isosorbide fatty acid esters are prepared by esterification of sorbitol with fatty acids under anhydrizing conditions. Either mono- or diesters of sorbitan and isosorbide are operative as emulsifiers in this invention, and the term esters is meant to include both.

The polyoxyethylene derivatives of the sorbitan and isosorbide fatty acid esters (either mono- or diesters are operative) may be prepared by reacting the isosorbide or sorbitan with ethylene oxide prior to esterification, known in the art as dendrizing, or by preparing a partial sorbitan or isosorbide fatty acid ester first and then reacting that fatty acid ester with ethylene oxide, known in the art as catenylating. The mole ratios of ethylene oxide to sorbitan fatty acid ester or isosorbide fatty acid ester may vary from about 4/1 to about 50/1, as designated polyoxyethylene (4–50) sorbitan or isosorbide fatty acid ester, with a 10/1 to 30/1 mole ratio the preferred range. The particular mole ratio of ethylene oxide to the fatty acid ester is determined by the amount of ethylene oxide necessary to maintain the HLB (hydrophile-lipophile balance) of the emulsifier blend, including the monoglyceride component, within a range sufficient to maintain a stable oil-in-water emulsion. It has been determined that an acceptable range of HLB is about 5.5 to 11.5, with 7.5 to 11.0 being the preferred range. In particular, an HLB range of 7.5 to 11.0 is preferred if the liquid shortening emulsion is to be used as an ingredient in cream icings. [For a detailed discussion of the HLB system see "Classification of Surface-Active Agents by HLB," by William C. Griffin, published in the Journal of Society of Cosmetic Chemists, vol. I, No. 5, pp. 311–326 (December 1949)] HLB's outside of the acceptable range are undesirable in this invention for they may cause the liquid shortening emulsion to be unstable and they may adversely affect the results in cakes and icings. It should be noted that the emulsifier blends used in the liquid shortening emulsions of this invention serve a dual function, (1) they cause the formation of a stable oil-in-water emulsion and (2) they also provide good quality cakes and icings due to their emulsifying effect, and the overall HLB of the emulsifier blend must be acceptable for performing this dual function.

The acceptable range of HLB can be obtained by balancing the fatty acid ester group (lipophilic emulsifier, i.e., oil soluble) against the ethylene oxide content (hydrophilic emulsifier, i.e., water soluble). In this respect, it should be noted that the total emulsifier blend, including all lipophile and hydrophile emulsifiers present, must be taken into account when determining the overall HLB for the liquid shortening emulsion. The HLB may be altered by varying the ethylene oxide content of the hydrophile emulsifier and the amount of hydrophile emulsifier per lipophile emulsifier. The HLB value is increased by increasing the ethylene oxide content and by increasing the amount of hydrophile emulsifier per lipophile emulsifier. The weight ratio of the lipophile emulsifier, excluding monoglyceride, to the hydrophile emulsifier may vary between 0 to 100 and about 80 to 20 respectively, with the preferred range being 10 to 90 and 60 to 40 respectively. Weight ratios outside of these ranges may adversely affect the stability of the emulsion and may have a deleterious effect on the cake and icing results.

Preferably, the emulsifier blend, excluding monoglyceride, should be added in amounts ranging from about 1–7 percent based on the weight of the liquid shortening emulsion. If less emulsifier blend is used, it has little or no effect as an emulsifying agent and may cause the emulsion to be unstable as well as provide poor results in cakes and icings. If more than about 7 percent is added, it is impractical and may have a deleterious effect on the results in cakes and icings.

In accordance with this invention, it is preferred to use a blend of sorbitan or isosorbide fatty acid esters with polyoxyethylene derivatives of sorbitan and isosorbide fatty acid esters as part of the emulsifier blend. As previously disclosed, a hydrophile emulsifier can be blended with a monoglyceride as the sole lipophile emulsifier provided that the blend has an acceptable HLB, and it will form a stable emulsion and will yield fair icings, but it will not provide as good cakes in some instances, especially chocolate cakes, as the preferred emulsifier blends. Using lipophile emulsifier blends with no hydrophile emulsifier constituent results in an unstable emulsion, poor cakes, and poor icings because an acceptable HLB cannot be achieved.

The liquid shortening emulsions of this invention are very easily prepared. All of the components except the water may be weighed and added together. In the instances when one or more of the components is plastic instead of liquid, the mixture should be heated to a temperature sufficient to melt the plastic components, thereby rendering the mixture liquid. This liquid mixture may then be added to the water, with simultaneous agitation, to form a crude emulsion. This crude emulsion may be further refined by homogenizing it at elevated pressures, such as about 2500 p.s.i.g. The final product is a stable, white, liquid shortening emulsion. It should be noted that if none of the emulsion components is plastic, the heating step may be omitted. Furthermore, more consistent results in preparing stable liquid shortening emulsions are achieved when the oil phase is added to the water, rather than adding water to the oil phase, although this is not critical.

When using the liquid shortening emulsion of this invention in cakes, icings, and other baking applications, one should be careful to use the amount of liquid shortening which will provide the amount of fat base (plastic shortening base or liquid vegetable oil) required by the recipe. Likewise, one should be careful to reduce the amount of water required by the recipe by the amount of water added in the form of liquid shortening emulsion.

The composition and performance of typical liquid shortening emulsions in accordance with this invention is demonstrated in the following examples. In these examples, all of the polyoxyethylene derivatives of sorbitan were prepared by catenylation and the polyoxyethylene derivatives of isosorbide were prepared by dendrization. Atmul 80, mono and diglycerides of lard acids (42% α-mono), was used as the source of plastic monoglyceride in these examples.

*Example 1*

Liquid shortening emulsions having the following compositions were prepared by adding all of the emulsifier blend constituents to the plastic shortening, melting this mixture, adding water to the melt with simultaneous agitation to form a crude emulsion, and further refining the crude emulsion by homogenizing it at 2500 p.s.i.g.

| (1) | Gm. |
|---|---|
| Armour soft shortening base | 522 |
| HLB 8.8: | |
| Sorbitan monostearate | 12 |
| Polyoxyethylene(20)sorbitan monostearate | 18 |
| Atmul 80 | 36 |
| Lactated glycerol palmitate | 12 |
| Water | 660 |
| | 1,260 |

This shortening is intended for use in cakes for the inclusion of both the monoglyceride and the modified monoglyceride provides for greater cake volume. It does, however, tend to thicken excessively if a large proportion of lactated monoglyceride is used.

| (2) | Gm. |
|---|---|
| Armour soft shortening base | 534.0 |
| HLB 10.4: | |
| Sorbitan monostearate | 9.0 |
| Polyoxyethylene(20)sorbitan monostearate | 21.0 |
| Atmul 80 | 36.0 |
| Water | 660.0 |
| | 1,260.0 |

This shortening provides an excellent combination of qualities for it gives very good volume and texture in both cakes and icings.

*Example 2*

These two liquid shortenings were incorporated into the following white cake formula and compared to a control cake using 60 gm. of commercial plastic shortening instead of 126 gm. of liquid shortening. In the control cake, 66 gm. of additional water were used to prepare the batter.

| White cake formula: | Gm. |
|---|---|
| Cake flour | 210 |
| Sugar | 243 |
| Salt | 6 |
| Dry non-fat milk solids | 18 |
| Dicalcium phosphate | 3.3 |
| Monocalcium phosphate | 2.2 |
| Sodium bicarbonate | 2.9 |
| Liquid shortening | 126 |
| | 611.4 |
| Additional ingredients: | |
| Egg white | 66 |
| Water | 171 |
| | 237 |
| Total batter weight | 848.4 |

Mixing procedure:
(1) Dry ingredients weighed and placed in mixing bowl.
(2) Liquid shortening added. Beaten for 2 min. at speed 4 in Hamilton Beach mixer.
(3) 66 gm. egg white added. Beaten 1 min. at speed 4.
(4) 171 gm. water added. Beaten ½ min. at speed 2. Scrape down. Mix at speed 2 for 1 min.
(5) Scale 390 gm. into each of two 8″ pans.
(6) Bake at 350° F. for 30 min.

RESULTS

| Shortening | Volume A (cc.) | Volume B (cc.) | Total vol. (cc.) | Texture |
|---|---|---|---|---|
| Liquid shortening (1) | 1,100 | 1,100 | 2,200 | Tender. |
| Liquid shortening (2) | 1,050 | 1,050 | 2,100 | Mod. tender. |
| Commercial shortening | 960 | 965 | 1,925 | Sl. tough. |

Example 3

Liquid shortening (2) was compared to the commercial plastic shortening used in Example 2 in a standard icing formula.

Liquid shortening icing:                           Gm.
    10X powdered sugar ........................ 908
    Non-fat dry milk powder .................... 56
    Salt ....................................... 6
    Liquid shortening (2) ...................... 454
                                                     1,416

Control icing:
    10X powdered sugar ........................ 908
    Non-fat dry milk powder .................... 56
    Commercial shortening ...................... 227
    Salt ....................................... 6
    Water ...................................... 160
                                                     1,416

Procedure: Scale ingredients in Hobart mixing bowl and cream 2 min. at slow speed. Scrape down bowl, then continue to cream at high speed for five minutes. Icing weighed in standard measuring cup.

Continue to cream for 5 additional minutes. Measure weight again and determine volume.

RESULTS

| Icing | Weight (gm.) 7 min. | Weight (gm.) 12 min. | Vol./100 gm., 12 min., cc. |
|---|---|---|---|
| Liquid Shortening (2) | 127 | 124 | 183.5 |
| Control | 158 | 154 | 135.0 |

The results of Examples 2 and 3 demonstrate that the liquid shortening emulsions of this invention provide comparable or better results in cakes and icings than presently used commercial plastic shortenings in addition to the ease of handling advantage. It is noted that liquid shortening (1) designed specifically for cakes gave the best results in the cake test; liquid shortening (2) gave almost as good results in the white cake and excellent results in the icing. Liquid shortenings (1) and (2) both performed better than the comercial plastic shortening.

Example 4

In order to determine the effect of altering the sorbitan fatty acid ester/polyoxyethylene fatty acid ester ratio, three liquid shortening emulsions were prepared using ratios of 80/20, 60/40, and 30/70 and these were compared with each other and with plastic shortenings.

RESULTS

| | Percent emulsifier (based on fat) | | | HLB | Batter, sp. gr. | Cake data | | |
|---|---|---|---|---|---|---|---|---|
| | Sorbitan mono-stearate | 20 catenyl sorbitan mono-stearate | Plastic α-mono-glyceride | | | Crust | Texture | Volume |
| WHITE CAKE | | | | | | | | |
| 1. Plastic fat | | | 2.5 | 4.9 | 1.02 | Normal | Mod. tough | 1,550 |
| 2. Plastic fat+ | 3.2 | 0.8 | 2.5 | 7.4 | 0.87 | do | Sl. tough | 1,870 |
| 3. Emulsion 1 | 2.4 | 0.6 | 2.5 | 7.1 | 0.77 | do | Sl. tender | 1,950 |
| 4. Emulsion 2 | 1.8 | 1.2 | 2.5 | 8.1 | 0.76 | do | do | 1,950 |
| 5. Emulsion 3 | 0.9 | 2.1 | 2.5 | 9.4 | 0.77 | do | Mod. tender | 2,000 |
| CHOCOLATE CAKE | | | | | | | | |
| 1. Plastic fat | | | 2.5 | 4.9 | 1.04 | Normal | Sl. tough | 1,800 |
| 2. Plastic fat+ | 3.2 | 0.8 | 2.5 | 7.4 | 0.86 | do | Sl. tender | 2,050 |
| 3. Emulsion 1 | 2.4 | 0.6 | 2.5 | 7.1 | 0.75 | Sl. fallen | do | 2,100 |
| 4. Emulsion 2 | 1.8 | 1.2 | 2.5 | 8.1 | 0.77 | do | do | 2,000 |
| 5. Emulsion 3 | 0.9 | 2.1 | 2.5 | 9.4 | 0.80 | do | do | 2,080 |

The results indicated that the best all-around results were obtained with the 30/70 ratio. Furthermore, the results indicated that better results in chocolate cakes were achieved using greater amounts of the sorbitan fatty acid eester. The results also demonstrated that the liquid shortening emulsions gave comparable or better results than the plastic shortenings.

Example 5

Liquid shortening emulsions using isosorbide fatty acid esters and polyoxyethylene derivatives of isosorbide fatty acid esters were prepared. The problem of unstable and thickened emulsions was encountered but some successful liquid emulsions were prepared and tested in cakes and icings.

RESULTS

| Emulsion | Percent emulsifier (based on fat) | | | Plastic mono-glycerides | HLB | Stability | |
|---|---|---|---|---|---|---|---|
| | Isosorbide mono-stearate | Isosorbide dioleate | 20-dendro isosorbide mono-stearate | | | Emul. | Visc. |
| 1 | 2.4 | | 1.6 | | 10.4 | Very good | Thin. |
| 2 | | 2.4 | 1.6 | | 8.7 | Good, sl. lumpy. | Do. |
| 3 | 3.6 | | 2.4 | | 10.4 | Very good | Do. |
| 4 | 1.6 | | 2.4 | | 12.1 | do | Do. |
| 5 | 0.9 | | 2.1 | 4 | 8.4 | do | Mod. thick. |

WHITE CAKE AND CREAM ICING PERFORMANCE

| | Sp. gr. | Crust | Texture | Volume | Icing volume | Texture |
|---|---|---|---|---|---|---|
| 1 | 0.89 | Normal | Sl. tender | 2,025 | 105.6 | Smooth and sl. thin. |
| 2 | 1.06 | Pale color | Tough | 1,680 | 97.5 | Do. |
| 3 | 0.88 | Normal | Sl. tender | 2,040 | 111.0 | Do. |
| 4 | 0.87 | do | do | 2,065 | 111.0 | Do. |
| 5 | 0.77 | do | Mod. tender | 2,285 | 160.5 | Light and fluffy. |

These results indicate that isosorbide monostearate/polyoxyethylene(20)isosorbide monostearate (30/70) at a level of 3.0% based on fat in the emulsion with added monoglyceride performs very well. This emulsion tended to thicken but it has been determined that use of the diester instead of the monoester produces thinner emulsions. It should be noted that the liquid shortening emulsions with the monoglyceride added gave much better results in both cakes and icings.

*Example 6*

The following liquid shortening emulsions were prepared using liquid vegetable oils in the fat base stocks except for emulsion 1.

The liquid shortening emulsions were prepared by adding each of the emulsifier blend constituents to the liquid vegetable oil and then adding water to the vegetable oil-emulsifier blend mixture with simultaneous agitation to form a crude emulsion. The crude emulsion was further refined by homogenizing it at 2500 p.s.i.g. to form a stable, white liquid shortening emulsion.

The results demonstrate that liquid vegetable oils, in emulsion form, can be used as shortenings for cakes and icings, as shown by emulsion 5, which is very unexpected in view of the results achieved using vegetable oils in nonemulsion form.

*Example 7*

The following liquid shortenings were prepared and were used in baking white and chocolate cakes. Two of the shortenings were emulsions of liquid vegetable oils and the other two shortenings were nonemulsified liquid vegetable oils.

|  | Emul. A | Emul. B | Short. 1 | Short. 2 |
|---|---|---|---|---|
| Cottonseed oil | 88.0 | 88.0 | 88.0 | 94.0 |
| Sorbitan monostearate | 1.8 | 1.8 | 1.8 | |
| Polyoxyethylene (20) sorbitan monostearate | 4.2 | 4.2 | 4.2 | |
| Atmul 80 | 6.0 | 6.0 | 6.0 | 6.0 |
| Water | 110.0 | 110.0 | | |
| Total | 210.0 | 210.0 | 100.0 | 100.0 |
|  | 10.8 HLB | 9.5 HLB | 10.8 HLB | 4.9 HLB |

RESULTS

|  | White cake batter | | Grain | Texture | Crust | Vol. (cc.) |
|---|---|---|---|---|---|---|
|  | Sp. g. | Texture | | | | |
| Emulsion A | 0.84 | Slightly creamy. | Fine | Moderately tender. | Normal | 2,170 |
| Emulsion B | 0.76 | Creamy | do | Slightly tender. | do | 2,100 |
| Shortening 1 | 0.90 | Slightly thin. | do | do | do | 2,060 |
| Shortening 2 | 1.16 | Very thin | Coarse | Tough | Tough | 1,570 |

CHOCOLATE CAKE

| Emulsion A | 0.93 | Slightly creamy. | Fine | Slightly tender. | Normal | 2,130 |
|---|---|---|---|---|---|---|
| Emulsion B | 0.89 | do | do | Moderately tender. | do | 2,300 |
| Shortening 1 | 0.95 | Slightly thin. | do | Slightly tough. | do | 2,055 |
| Shortening 2 | 1.16 | Very thin | Coarse | Tough | Tough | 1,920 |

|  | Weight (gms.) | | | | |
|---|---|---|---|---|---|
|  | 1 | 2 | 3 | 4 | 5 |
| Hydrogenated veg. oil | 435.0 | 391.5 | 326.0 | 217.5 | |
| Soybean oil | | 43.5 | 109.0 | 217.5 | 435.0 |
| 8.8 HLB; Sorbitan monostearate | 5.3 | 5.3 | 5.3 | 5.3 | 5.3 |
| Polyoxyethylene (20) sorbitan monostearate | 12.2 | 12.2 | 12.2 | 12.2 | 12.2 |
| Atmul 80 | 47.5 | 47.5 | 47.5 | 47.5 | 47.5 |
| Water | 550.0 | 550.0 | 550.0 | 550.0 | 550.0 |
| Total | 1,050.0 | 1,050.0 | 1,050.0 | 1,050.0 | 1,050.0 |

These results indicate that an unexpected improvement in quality is achieved when a sorbitan fatty acid ester/polyoxyethylene derivative of a sorbitan fatty acid ester and monoglyceride are combined with the oil in emulsion form rather than dispersed in the oil alone. The results also show that sorbitan fatty acid ester is essential for getting good results in chocolate cakes.

*Example 8*

In addition to sorbitan monostearate and polyoxyethylene sorbitan monostearate, combinations of palmitate, laurate and oleate esters of sorbitan and isosorbide with the polyoxyethylene ethers of such esters have been tested

RESULTS

| Emulsion | Batter | | White Cake | | Crust | Volume |
|---|---|---|---|---|---|---|
|  | Sp. g. | Texture | Grain | Texture | | |
| 1 | 0.74 | Smooth and creamy. | Slightly coarse. | Slightly tender. | Normal | 1,975 |
| 2 | 0.72 | do | Fine | do | do | 1,975 |
| 3 | 0.73 | do | do | do | do | 1,985 |
| 4 | 0.72 | do | do | Moderately tender. | do | 2,025 |
| 5 | 0.76 | do | do | do | do | 2,060 |
| Soybean oil (nonemulsified). | 1.06 | Thin | Coarse | Tough and rubbery. | Tough | 1,480 | for their effectiveness in liquid vegetable oil emulsions. The following emulsions were prepared:

The invention has been described and illustrated by a number of examples, but it is to be understood that it is

| Emulsion No. | 1 | 2 | 3 | 4 | 5 | 6 | 7 | 8 | 9 | 10 | 11 | 12 |
|---|---|---|---|---|---|---|---|---|---|---|---|---|
| Sorbitan monolaurate | 1.5 | | | | 1.5 | | | | 1.5 | | | |
| Sorbitan monopalmitate | | 1.5 | | | | 1.5 | | | | 1.5 | | |
| Sorbitan monostearate | | | 1.5 | | | | 1.5 | | | | 1.5 | |
| Sorbitan tristearate | | | | | | | | | | | | 1.5 |
| Sorbitan monooleate | | | | 1.5 | | | | 1.5 | | | | |
| Propylene glycol monostearate | | | | | | | | | | | | |
| 20 dendro sorbitan monolaurate | 3.5 | 3.5 | 3.5 | 3.5 | | | | | | | | |
| 20 dendro sorbitan monopalmitate | | | | | 3.5 | 3.5 | 3.5 | 3.5 | | | | |
| 20 dendro sorbitan monostearate | | | | | | | | | 3.5 | 3.5 | 3.5 | |
| 20 dendro sorbitan tristearate | | | | | | | | | | | | 3.5 |
| 20 dendro sorbitan monooleate | | | | | | | | | | | | |
| Sorbitan sesquioleate | | | | | | | | | | | | |
| 15 dendro isosorbide distearate | | | | | | | | | | | | |
| 20 dendro isosorbide monostearate | | | | | | | | | | | | |
| Isosorbide dioleate | | | | | | | | | | | | |
| Isosorbide monopalmitate | | | | | | | | | | | | |
| Atmul 80 | 6.0 | 6.0 | 6.0 | 6.0 | 6.0 | 6.0 | 6.0 | 6.0 | 6.0 | 6.0 | 6.0 | 6.0 |
| Cottonseed oil | 89 | 89 | 89 | 89 | 89 | 89 | 89 | 89 | 89 | 89 | 89 | 89 |
| Water | 110 | 110 | 110 | 110 | 110 | 110 | 110 | 110 | 110 | 110 | 110 | 110 |
| Total | 210.0 | 210.0 | 210.0 | 210.0 | 210.0 | 210.0 | 210.0 | 210.0 | 210.0 | 210.0 | 210.0 | 210.0 |

| Emulsion No. | 13 | 14 | 15 | 16 | 17 | 18 | 19 | 20 | 21 | 22 | 23 | 24 |
|---|---|---|---|---|---|---|---|---|---|---|---|---|
| Sorbitan monolaurate | 1.5 | | | | | | | | | | | |
| Sorbitan monopalmitate | | 1.5 | | | | | | | | | | |
| Sorbitan monostearate | | | 1.5 | 1.5 | | | | | | | 1.5 | 1.5 |
| Sorbitan tristearate | | | | | | | | | | | | |
| Sorbitan monooleate | | | | | | | | | | | | |
| Propylene glycol monostearate | | | | | | | | | | 1.5 | | |
| 20 dendro sorbitan monolaurate | | | | | | | | | | | | |
| 20 dendro sorbitan monopalmitate | | | | | | | | | | | | |
| 20 dendro sorbitan monostearate | | | | | | | | | | 3.5 | 3.5 | 3.5 | 3.5 |
| 20 dendro sorbitan tristearate | | | | | | | | | | | | |
| 20 dendro sorbitan monooleate | 3.5 | 3.5 | 3.5 | | | | | | | | | |
| Sorbitan sesquioleate | | | | 3.5 | | | | | | | | |
| 15 dendro isosorbide distearate | | | | | 3.5 | | 3.5 | | | | | |
| 20 dendro isosorbide monostearate | | | | | | 3.5 | | 3.5 | | | | |
| Isosorbide dioleate | | | | | | | 1.5 | 1.5 | 1.5 | | | |
| Isosorbide monopalmitate | | | | | 1.5 | 1.5 | | | | | | |
| Atmul 8 | 6.0 | 6.0 | 6.0 | 6.0 | 6.0 | 6.0 | 6.0 | 6.0 | 6.0 | 6.0 | 6.0 | 6.0 |
| Cottonseed oil | 89 | 89 | 89 | 89 | 89 | 89 | 89 | 89 | 89 | 89 | 89 | 89 |
| Water | 110 | 110 | 110 | 110 | 110 | 110 | 110 | 110 | 110 | 110 | 10 | 30 |
| Total | 210.0 | 210.0 | 210.0 | 210.0 | 210.0 | 210.0 | 210.0 | 210.0 | 210.0 | 210.0 | 110.0 | 130.0 |

RESULTS

| Emulsion No. | HLB | White cake volumes (cc.) |
|---|---|---|
| 1 | 11.1 | 1,650 |
| 2 | 11.0 | 2,050 |
| 3 | 10.9 | 2,285 |
| 4 | 10.9 | 1,730 |
| 5 | 10.8 | 1,670 |
| 6 | 10.7 | 2,285 |
| 7 | 9.8 | 2,300 |
| 8 | 10.6 | 1,760 |
| 9 | 10.6 | 1,685 |
| 10 | 10.5 | 2,230 |
| 11 | 10.4 | 2,170 |
| 12 | 8.2 | 2,130 |
| 13 | 10.7 | 1,740 |
| 14 | 10.6 | 1,945 |
| 15 | 10.5 | 2,150 |
| 16 | 5.7 | 2,150 |
| 17 | 8.5 | 2,160 |
| 18 | 10.2 | 1,890 |
| 19 | 7.8 | 2,040 |
| 20 | 9.6 | 1,800 |
| 21 | 10.3 | 1,700 |
| 22 | 9.7 | 1,990 |
| 23 | 10.3 | ----- |
| 24 | 10.3 | ----- |

All emulsions except Nos. 23 and 24 were liquid and stable. 23 and 24 were unstable because there wasn't enough water in the emulsion. This demonstrates the criticality in the amount of water necessary to get a stable emulsion.

The foregoing specific examples clearly demonstrate that stable liquid shortening emulsions can easily be prepared in accordance with this invention. These novel liquid shortenings contribute three real advantages to the art: (1) ease of handling, (2) results in cakes and icings comparable to or better than the results achieved by using plastic shortenings and (3) the use of liquid vegetable oils as shortenings in cakes and icings.

subject to many variations without departing from the spirit of the invention.

What is claimed is:

1. A liquid shortening emulsion consisting essentially of about 30 to about 55 percent by weight of a fat base selected from the group consisting of liquid vegetable oils, plastic vegetable fats, plastic animal fats and mixtures thereof, about 40 to about 65 percent by weight of water, about 1.5 to about 6 percent by weight of a monoglyceride having an iodine value of at least about 40, and about 1 to about 7 percent of an emulsifier composition consisting essentially of a lipophile emulsifier selected from the group consisting of sorbitan fatty acid esters and isosorbide fatty acid esters and a hydrophile emulsifier selected from the group consisting of polyoxyethylene sorbitan fatty acid esters and polyoxyethylene isosorbide fatty acid esters, said lipophile emulsifier and said hydrophile emulsifier being present in said emulsion in a ratio by weight within a range of about 0 to 100 and 80 to 20, respectively, the overall hydrophile-lipophile balance of said monoglyceride and said emulsifier composition in said emulsion having a value within a range of about 5.5 to about 11.5.

2. A liquid shortening emulsion in accordance with claim 1 in which the sorbitan and isosorbide fatty acid esters and their polyoxyethylene derivatives are selected from the group consisting of stearates, palmitates, oleates and behenates.

3. A liquid shortening emulsion in accordance with claim 2 wherein said emulsifier composition contains polyoxyethylene(20)sorbitan monostearate.

4. A liquid shortening emulsion in accordance with claim 2 wherein said emulsifier composition contains sorbitan monostearate and polyoxyethylene(20)sorbitan monostearate.

5. A liquid shortening emulsion in accordance with claim 2 in which the fat base is a liquid vegetable oil.

6. A liquid shortening emulsion in accordance with claim 5 wherein said emulsifier composition contains sorbitan monostearate and polyoxyethylene(20)sorbitan monostearate.

7. A liquid shortening emulsion in accordance with claim 5 wherein said emulsifier composition contains isosorbide monopalmitate and polyoxyethylene(15)isosorbide distearate.

8. A liquid shortening emulsion consisting essentially of about 30 to about 55 percent by weight of a plastic fat base, about 40 to about 65 percent by weight of water, about 1.5 to about 6 percent by weight of a monoglyceride having an iodine value of at least about 40, and about 1 to about 7 percent of an emulsifier composition consisting essentially of a lipophile emulsifier selected from the group consisting of sorbitan fatty acid esters and isosorbide fatty acid esters and a hydrophile emulsifier selected from the group consisting of polyoxyethylene sorbitan fatty acid esters and polyoxyethylene isosorbide fatty acid esters, said lipophile emulsifier and said hydrophile emulsifier being present in said emulsion in a ratio by weight within a range of about 0 to 100 and 80 to 20, respectively, the overall hydrophile-lipophile balance of said monoglyceride and said emulsifier composition in said emulsion having a value within a range of about 5.5 to 11.5.

9. A liquid shortening emulsion in accordance with claim 8 in which the sorbitan and isosorbide fatty acid esters and their polyoxyethylene derivatives are selected from the group consisting of stearates, palmitates, oleates and behenates.

10. A liquid shortening emulsion in accordance with claim 9 wherein said emulsifier composition contains polyoxyethylene(20)sorbitan monostearate.

11. A liquid shortening emulsion in accordance with claim 9 wherein said emulsifier composition contains sorbitan monostearate and polyoxyethylene(20)sorbitan monostearate.

12. A liquid shortening emulsion in accordance with claim 9 wherein said emulsifier composition contains isosorbide monostearate and polyoxyethylene(20)isosorbide monostearate.

References Cited in the file of this patent

UNITED STATES PATENTS

| | | |
|---|---|---|
| 2,508,393 | Jaeger | May 23, 1950 |
| 2,569,527 | Johnstone | Oct. 2, 1951 |
| 2,671,027 | Cross | Mar. 2, 1954 |
| 2,808,336 | Kalish | Oct. 1, 1957 |
| 2,968,564 | Schroeder et al. | Jan. 17, 1961 |

UNITED STATES PATENT OFFICE
CERTIFICATE OF CORRECTION

Patent No. 3,117,010                                      January 7, 1964

Alan S. Geisler

It is hereby certified that error appears in the above numbered patent requiring correction and that the said Letters Patent should read as corrected below.

Column 3, line 18, for "valve" read -- value --; line 20, before "sold" insert -- is --; column 4, line 3, for "operate" read -- separate --; column 6, line 46, for "bicrarbonate" read -- bicarbonate --; column 8, line 42, for "eester" read -- ester --; columns 11 and 12, in the table, first column, line 4 from the bottom of the table, for "Atmul 8" read -- Atmul 80 --.

Signed and sealed this 23rd day of June 1964.

(SEAL)
Attest:

ERNEST W. SWIDER                                   EDWARD J. BRENNER
Attesting Officer                                       Commissioner of Patents